United States Patent
Schaffstein et al.

(10) Patent No.: US 7,716,512 B1
(45) Date of Patent: May 11, 2010

(54) REAL TIME CLOCK CONTENT VALIDATION

(75) Inventors: Michael J. Schaffstein, Waltham, MA (US); Brendan P. Mullaly, Nashua, NH (US); John J. Koger, Newton, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 1490 days.

(21) Appl. No.: 11/032,578

(22) Filed: Jan. 10, 2005

Related U.S. Application Data

(60) Provisional application No. 60/535,404, filed on Jan. 9, 2004.

(51) Int. Cl.
*G06F 9/00* (2006.01)

(52) U.S. Cl. .............. 713/500; 713/1; 713/2; 713/322

(58) Field of Classification Search .......... 713/1, 713/2, 500–503, 322
See application file for complete search history.

(56) References Cited

U.S. PATENT DOCUMENTS

| | | | | |
|---|---|---|---|---|
| 5,146,585 A | * | 9/1992 | Smith, III ............ 713/400 |
| 5,475,707 A | * | 12/1995 | Ficarra et al. ............ 375/141 |
| 5,548,166 A | * | 8/1996 | Stolowicki ............ 307/50 |
| 5,874,789 A | * | 2/1999 | Su ............ 307/141 |
| 6,393,306 B1 | * | 5/2002 | Hobbi ............ 455/566 |

\* cited by examiner

*Primary Examiner*—Kimyen Vu
*Assistant Examiner*—Randal D Moran
(74) *Attorney, Agent, or Firm*—John R. Thompson; Stoel Rives LLP

(57) ABSTRACT

Disclosed is a method of validating the contents of a real-time clock in a digital circuit. A plurality of memory elements create a first random signature value when power is newly applied to a circuit. The plurality of memory elements maintain the first random signature value while power to the circuit is maintained. The first random signature value is stored as a reference value such that the reference value is not altered by a power interruption. When power to the circuit is lost and then regained, a second random signature value is created. The second random signature value likely will no longer match the reference value because both the reference value and the second signature are random. When the reference value does not match the signature value, the real-time clock value is considered invalid. User input may be employed to correct the real-time clock value.

3 Claims, 1 Drawing Sheet

REAL TIME CLOCK CONTENT VALIDATION

REFERENCE TO PENDING PRIOR PATENT APPLICATION

This patent application claims benefit of prior U.S. Provisional Patent Application Ser. No. 60/535,404, filed Jan. 9, 2004 by Michael J. Schaffstein et al. for REAL TIME CLOCK CONTENT VALIDATION.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application-Specific Integrated Circuit) such as those produced by Oasis Semiconductor, Inc. of Waltham, Mass.

BACKGROUND

A real-time clock is a device that keeps track of time and can communicate the time and date to other devices electronically. When power is removed from a system, the real-time clock derives its power from an alternate source (such as a battery) so that it can maintain its sense of time. The alternate power source will eventually weaken to the point that it cannot adequately supply power to the real-time clock. The real-time clock will then lose its sense of absolute time. When the real-time clock and system regain power the real-time clock must evaluate its concept of time to understand if it is valid or not. It will report this status to the system.

An analog circuit that detects a loss of power is the most common method for invalidating the contents of a real-time clock. The analog circuit monitors the voltage applied to the real-time clock circuits and senses when the voltage drops below a set threshold at which point the contents are marked as invalid. Such an analog circuit cannot exist in a pure digital circuit.

DETAILED DESCRIPTION OF THE INVENTION

Figure 1:
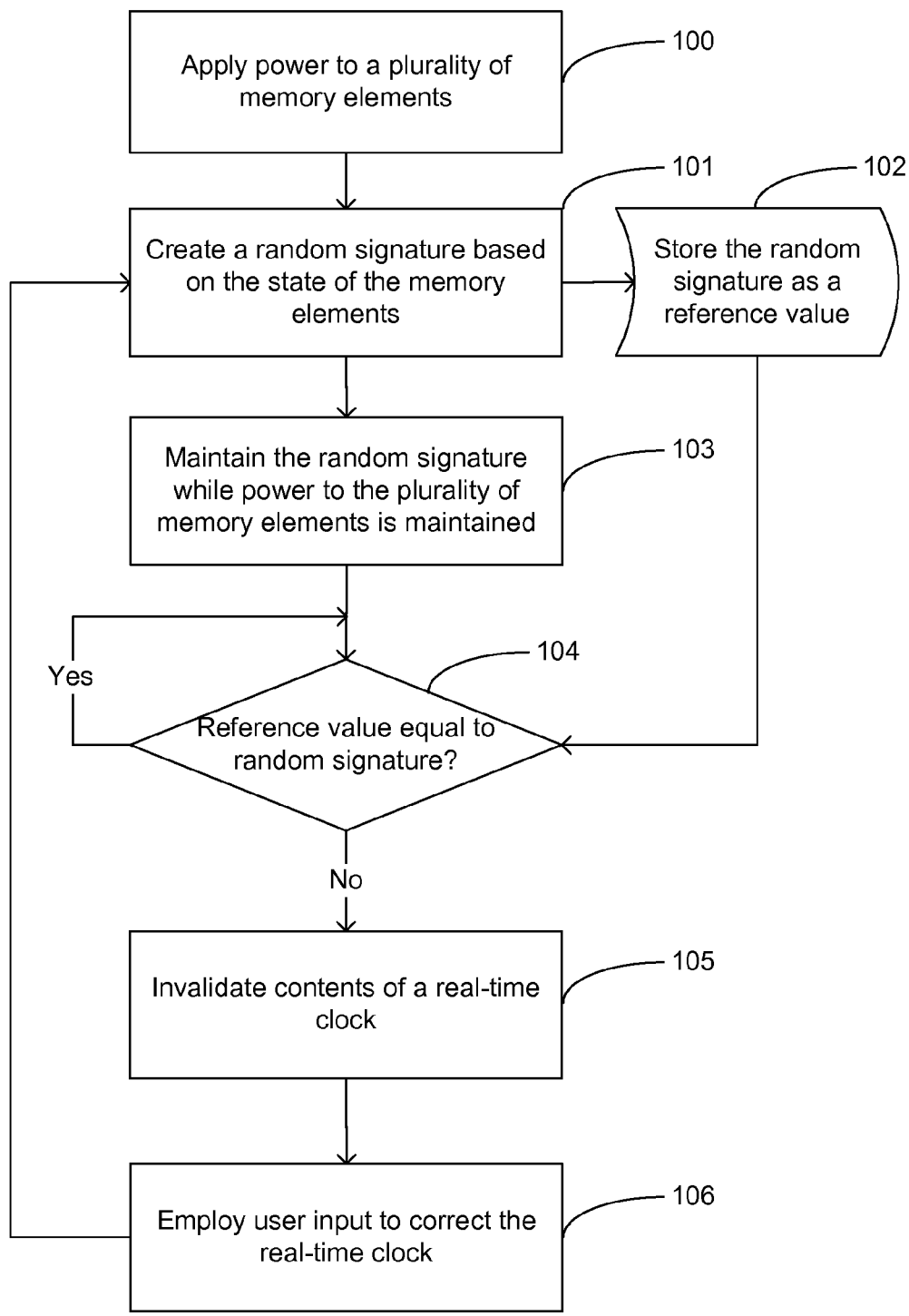
FIG. 1 is a flow chart of a method of validating the content of a real-time clock.

A digital circuit which implements a real-time clock must solve the problem of knowing if its contents are valid without the use of an analog voltage monitor. Content is stored in memory elements known as flip-flops. The memory state of a flip-flop has the characteristic of being random when power is first applied. A method that exploits this randomness can be used to guarantee the contents of a real-time clock.

A set of N number of flip-flops, called the signature, is created. The signature's value when power is first applied is random. A reference value is chosen by the system which is compared to the signature. If the values match, the real-time clock's contents are valid and the timing is considered accurate. If they do not match, the contents are considered invalid and the time/date information is ignored. The system must then ask the user for correct time and date information. This in turn is written into the real-time clock's content and the signature is written to the system's reference value.

The real-time clock maintains the signature at the reference value while power to the real-time clock is maintained. When power is lost and then regained, the signature is considered random and it is likely that the reference value will no longer match. The probability that the random contents achieve a match can be decreased by increasing the number of flip-flops, N, used to represent the signature. A hardware method is used to further increase the chances of signature loss as power fails by constantly shifting the signature value through the flop-flops. Carefully choosing a signature value that is known to be difficult to achieve through the random power on characteristics of a flip-flop is also used to prevent accidental valid detection.

Through this method a digital circuit can determine the validity of a real-time clock's contents beyond a reasonable failure rate.

FIG. 1 is a flow chart illustrating one embodiment of a method for validating the content of a real-time clock. At step 100, power is applied to a plurality of memory elements, such as flip flops. At step 101, a random signature is created based on the state of the memory elements. At step 102, the random signature is stored as a reference value. The reference value is stored such that it is not altered by a power interruption. In step 103, the random signature is maintained while power to the plurality of memory elements is maintained. In step 104, the reference value is compared to the random signature. This continues until the reference value is not equal to the random signature. At step 105, the contents of a real-time clock is invalidated because the reference value is no longer equal to the random signature. In step 106, a user input is employed to correct the real-time clock.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A digital circuit for performing a method of validating the contents of a real-time clock, the method comprising:
   applying power to a plurality of memory elements, wherein said plurality of memory elements have a random state when power is newly applied to said plurality of memory elements;
   creating a random signature using said random state of said plurality of memory elements;
   maintaining said random signature in said plurality of memory elements while power to said circuit is maintained;
   storing said random signature as a reference value, wherein said reference value is not altered by a power interruption;
   comparing said reference value to said random signature; and identifying when said random signature does not match said reference value.

2. The method according to claim 1, comprising the additional steps of:

employing user input to correct said real-time clock;

creating a second random signature value by providing power to said circuit rewriting said reference value to be equal to said second random signature value.

3. The method according to claim 1, wherein said random signature value is generated through flip-flops.

* * * * *